(12) United States Patent
Davis

(10) Patent No.: US 12,680,640 B1
(45) Date of Patent: Jul. 14, 2026

(54) HIGH-VACUUM FINGER CLAMP

(71) Applicant: United States of America as represented by the Administrator of NASA, Washington, DC (US)

(72) Inventor: Kenny R. Davis, Fruitland, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 19/076,699

(22) Filed: Mar. 11, 2025

(51) Int. Cl.
F16L 37/127 (2006.01)
F16L 37/00 (2006.01)
F16L 37/14 (2006.01)

(52) U.S. Cl.
CPC ........... F16L 37/127 (2013.01); F16L 37/002 (2013.01); F16L 37/14 (2013.01)

(58) Field of Classification Search
CPC ... F16L 37/127; F16L 37/002; F16L 37/1205; F16L 37/122

USPC ................................. 285/920, 322, 323, 324
See application file for complete search history.

(56) References Cited

U.S. PATENT DOCUMENTS

| | | | | |
|---|---|---|---|---|
| 2,425,500 A * | 8/1947 | Wiggins | ............... | F16L 37/127 |
| | | | | 137/614.04 |
| 2,888,278 A * | 5/1959 | Torres | .................. | F16L 37/127 |
| | | | | 285/313 |
| 7,857,361 B1 * | 12/2010 | Hanser | .................. | F16L 37/138 |
| | | | | 285/91 |
| 8,469,407 B2 * | 6/2013 | Tausch | .................. | F16L 37/127 |
| | | | | 285/35 |
| 12,252,949 B2 * | 3/2025 | Kibler | .................. | F16L 37/002 |
| 2019/0301260 A1 * | 10/2019 | Kibler | .................. | F16L 37/002 |

* cited by examiner

*Primary Examiner* — David Bochna
(74) *Attorney, Agent, or Firm* — Derek J. Langdon; Matthew F. Johnston; Trenton J. Roche

(57) ABSTRACT

A vacuum finger clamping device includes a slip collar assembly and a rook assembly. The rook assembly has one or more spring-loaded finger assemblies. The slip collar assembly is configured to be disposed over the rook assembly to cause the finger member to engage with a surface of a first flange member of a vacuum tube connection in an engaged state of the clamping device.

11 Claims, 12 Drawing Sheets

HIGH-VACUUM FINGER CLAMP

INVENTION BY GOVERNMENT EMPLOYEE(S) ONLY

The invention described herein was made by one or more employees of the United States Government, and may be manufactured and used by or for the Government for governmental purposes without the payment of any royalties thereon or therefore.

FIELD

The aspects of the disclosed embodiments relate generally to high vacuum finger clamps. In particular, the aspects of the disclosed embodiments are directed to a high vacuum finger clamp that can be remotely disconnected.

BACKGROUND

A nominal width (NW) Klein Flange (KF) finger clamp is a type of clamp used in vacuum systems to connect components with standard flanges. The NW/KF finger clamp provides a quick release type of flange commonly used in vacuum applications. These flanges are defined by ISO standards (ISO-KF), and they are characterized by their simplicity, ease of use, and reliable sealing.

In order to release an ISO standard quick-release flange, personnel need to be able to access the flange and clamp. This can be problematic in situations where access is difficult or the presence of personnel is undesirable, such as in hazardous conditions. It would be advantageous to be able to remotely disconnect a quick release flange in certain conditions or environments.

Accordingly, it would be desirable to provide a flange clamp that addresses at least some of the problems described above.

SUMMARY

The aspects of the disclosed embodiments are directed to a finger clamp for flanges in vacuum systems that can be disconnected remotely. The apparatus of the disclosed embodiments has particular applicability to NASA Goddard Space Flight Center (GSFC) Space applications. The device of the disclosed embodiments provides a high vacuum finger clamp that combines safety, efficiency, and versatility, while enabling securely connecting and remotely disconnecting vacuum flanges in hazardous environments. These and other advantages of the disclosed embodiments are provided substantially as shown in, and/or described in connection with, at least one of the figures, as set forth in the independent claims. Further advantageous modifications can be found in the dependent claims.

According to a first aspect the disclosed embodiments are directed to a vacuum finger clamping device. In one embodiment, the vacuum finger clamping device includes a slip collar assembly and a rook assembly. The rook assembly has one or more spring-loaded finger assemblies. The slip collar assembly is configured to be disposed over the rook assembly to cause the finger member to engage with a surface of a first flange member of a vacuum tube connection in an engaged state of the clamping device.

In a possible implementation form the slip collar assembly is configured to slide over the rook assembly.

In a possible implementation form, the slip collar assembly is configured to engage the finger assemblies and press the finger assemblies inwards as the slip collar assembly is slid over the rook assembly.

In a possible implementation form a finger member of the one or more springloaded finger assemblies includes a pivot end and a hook end, the hook end configured to engage with the surface of the first flange member as the slip collar assembly slides over the finger member.

In a possible implementation form a spring member is disposed between the pivot end of the finger member and a housing for the finger member. The spring member is configured to be in a compressed state when the slip collar assembly is disposed over the finger member in the engaged state.

In a possible implementation form, the spring member is configured to cause the finger member to move away from the flange member as the slip collar assembly disengages from the rook member.

In a possible implementation form a plate member is disposed on an end of a housing member for the finger assembly. The plate member configured to engage with a surface of a second flange member of the vacuum tube connection in the engaged state of the device.

In a possible implementation form, the first flange member and the second flange member are configured to be securely coupled together between the hook member and the plate member of the finger housing in the engaged state.

In a possible implementation form the rook assembly further comprises a post member. A plate or tab member is disposed at one end of the post member. The plate or tab member is configured to engage a surface of the slip collar when the slip collar is disposed over the rook assembly in the engaged state of the device.

In a possible implementation form one or more eye rings are secured to the slip collar assembly. The one or more eye rings are configured to engage with one or more of a linear actuator or winch that is configured to exert a force on the slip collar assembly to disengage the slip collar assembly from the one or more spring-loaded finger assemblies.

In a possible implementation form the clamping device is configured to be decoupled from the vacuum tube connection from a remote location.

In a possible implementation form the rook assembly further comprises a base member. The base member includes an opening configured to accommodate a tube portion of a vacuum tube. One end of the one or more spring-loaded finger assemblies and one end of the one or more post members are disposed on the base member.

In a possible implementation form the rook assembly further comprises a first member and a second member. The first member and the second member are configured to be disposed around the tube portion of the vacuum tube and connected together.

In a possible implementation form the clamping device is configured for a NW/KF vacuum flange.

In a possible implementation form a pin member is configured to be inserted into an opening on the rook assembly and prevent movement of the slip collar assembly.

In a possible implementation form the slip collar assembly is configured to be secured between a plate member disposed on the rook assembly and the pin member.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the aspects of the disclosed embodiments will be described in more detail with reference to the example embodiments shown in the drawings, in which.

DETAILED DESCRIPTION

The following detailed description illustrates exemplary aspects of the disclosed embodiments and ways in which they can be implemented. Although some modes of carrying out the aspects of the disclosed embodiments have been disclosed, those skilled in the art would recognize that other embodiments for carrying out or practicing the aspects of the disclosed embodiments are also possible.

Figure 1:
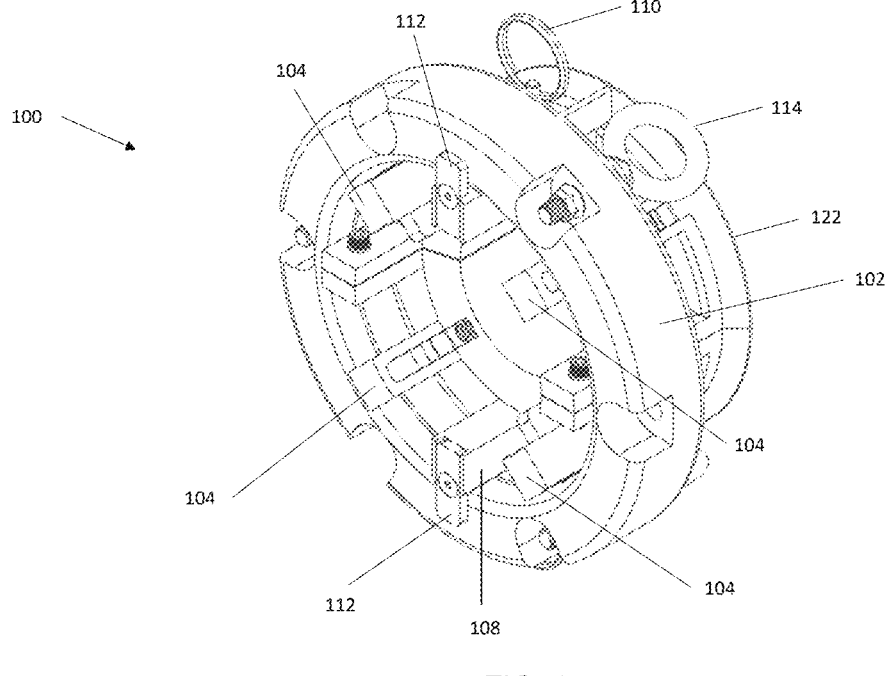
FIG. 1 is schematic block diagram of an apparatus incorporating aspects of the disclosed embodiments.

Referring to FIG. 1, one example of a flange clamping device or apparatus 100 incorporating aspects of the disclosed embodiments is illustrated. The aspects of the disclosed embodiments are directed to a high-vacuum finger clamp that securely clamps two flanges together, while also providing a remote disconnect feature. The clamping device 100 of the disclosed embodiments is configured to securely connect and remotely disconnect flanges in vacuum systems, such as NW/KF-50 flanges. The clamping device 100 finds particular application in high vacuum environments and conditions where the use of personnel to disconnect flanges is not desired. An example of this is in sounding rocket applications.

While the flange clamping device 100 has particular applicability to a NW/KF-50 type flange, the aspects of the disclosed embodiments are not so limited. In alternate embodiments, the clamping device 100 can be implemented in any suitable high vacuum environment, where remote disconnection is desired.

As shown in FIG. 1, the clamping device 100 of the disclosed embodiments generally comprises a slip collar 102 assembly and a spring-loaded finger assembly 104. In the example of FIG. 1, clamping device 100 includes four spring-loaded finger assemblies 104. In alternate embodiments, clamping device 100 can include any suitable number of spring-loaded finger assemblies, other than including four.

In one embodiment, the slip collar 102 is configured to slide over and engage the fingers of the spring-loaded finger assemblies 104, as will be described further herein. In an engaged position or state, also referred to as the closed position or state, the spring-loaded finger assemblies are configured to act as a clamp to secure two flanges together, as will be further described herein.

Figure 2:
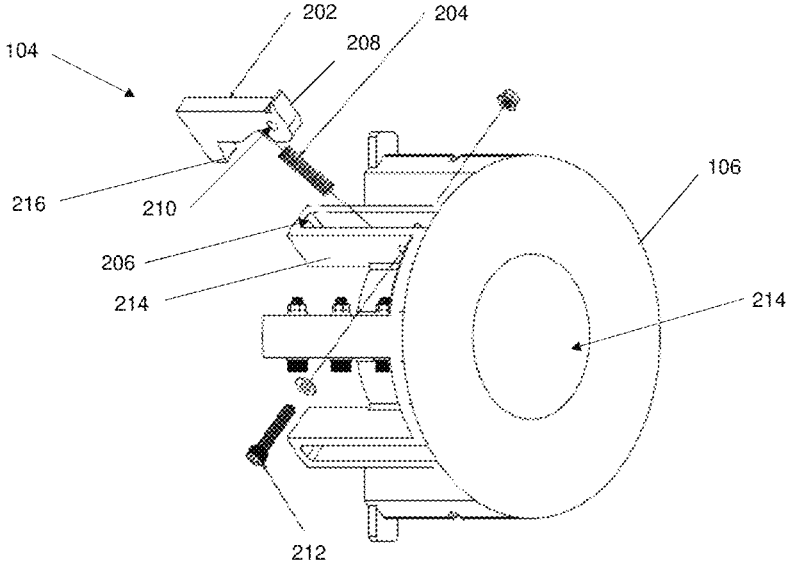
FIG. 2 is a schematic block diagram of an exemplary rook assembly for an apparatus incorporating aspects of the disclosed embodiments.

FIG. 2 illustrates a detailed example of a spring-loaded finger assembly 104. As is shown in FIG. 2, in this example, the spring-loaded finger assembly includes a finger member 202 and a spring member 204. The finger member 202 and the spring member 204 are movably retained in a recess or cavity 206 of a finger housing 214.

In one embodiment, the finger member 202 is configured to pivot or rotate about a pivot pin 212. As shown in FIG. 2, one end 208 of the finger member 202, also referred to herein as a pivot end, includes an opening 210 that is configured to receive the pivot pin 212. The pivot pin 212 is configured to be retained in corresponding openings or recesses 210 in the finger housing 214 and allows the pivot end 208 of the finger member 202 to pivot or move within the recess 206.

The other end 216 of the finger member 202, also referred to herein as a hook end, is configured to extend over an end of the finger housing 214 in an engage state. The hook end 216 of the finger member 202 is configured to engage a surface of a corresponding flange member and securely couple one flange member to another flange member.

In the example of FIG. 2, the pivot pin 212 comprises a screw of bolt mechanism. In alternate embodiments, and suitable device can be used for the pivot member 212.

The spring member 204 is generally configured to cause the end 216 of the finger member 202 to move and disengage from the flange members. The spring member 204 acts to allow the finger member 202 to disengage and allow a smooth release and open.

When the slip collar assembly 102 slides over the finger member 202, the finger member 202 compress the spring member 204. This compression causes the finger member 202 to engage with and lock onto the other KF flange.

The other end 216 of the finger member 202 is configured as a flange retaining member. When the slip collar assembly 102 slides over the finger member 202, the end 216 engages with the flange member in order to secure two flange members together. In one embodiment, the end 216 of the finger member 202 is shaped or hinged and is configured to lay against the collar angle.

The spring-loaded finger assemblies 104 generally comprises or form what is generally referred to herein as rook assembly 106. As shown in the example of FIG. 3, in one embodiment, the rook assembly includes the spring-loaded finger assemblies 104 and one or more post members 108.

Figure 3:
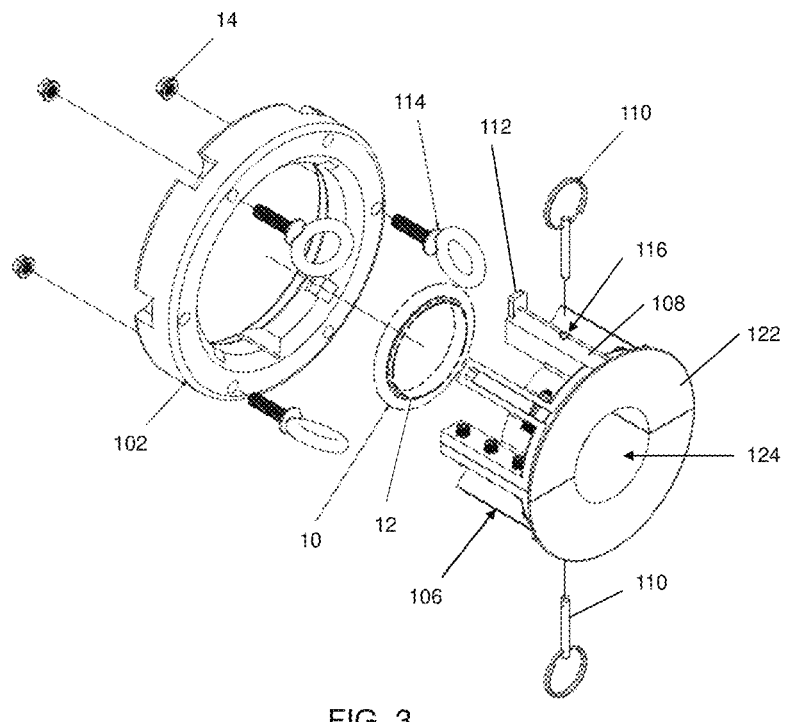
FIG. 3 is an assembly diagram of an apparatus incorporating aspects of the disclosed embodiments.
Figure 8:
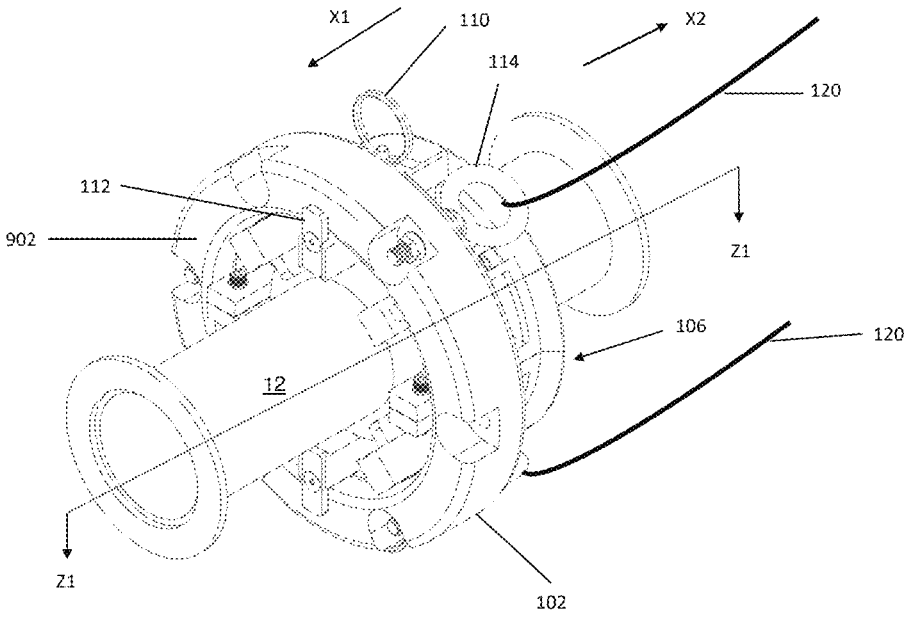
FIG. 8 illustrates an exemplary implementation of an apparatus incorporating aspects of the disclosed embodiments.
Figure 9:
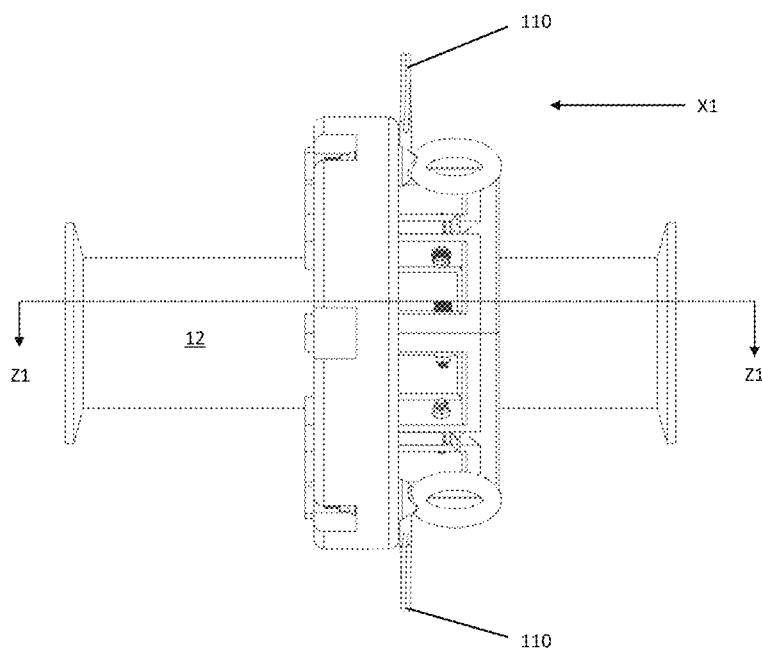
FIG. 9 is a side view of the example of FIG. 8.

As shown in FIG. 3, the base member 122 also includes an opening 124. As is also illustrated in FIGS. 8 and 9, the opening 124 is generally configured to receive or accommodate a tube portion 12 of a vacuum tube with a flange 10. The post members 108, together with the spring-loaded finger assemblies 104, are generally arranged along a perimeter of a base member 122 of the rook assembly 106, around the opening 124 and extend away from the base member 122.

Referring also to FIG. 1, in one embodiment, a post member 108 can include a plate or tab member 112, also referred to herein as a back plate. The plate member 112 is generally configured to provide a stop for the slip collar 102 when it is slides over the rook assembly 106, as will be described further herein. As shown in the example of FIGS. 1 and 3, the rook assembly 106 includes two plate members 112. In alternate embodiments, the rook assembly 106 can include any suitable number of plate members 112, other than including two.

Figure 4:
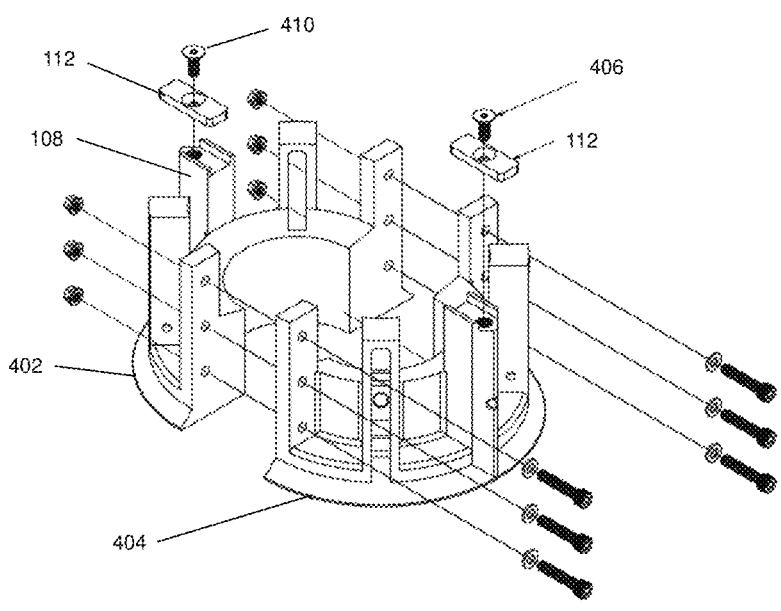
FIG. 4 is an assembly diagram of an exemplary rook assembly for an apparatus incorporating aspects of the disclosed embodiments.
Figure 5:
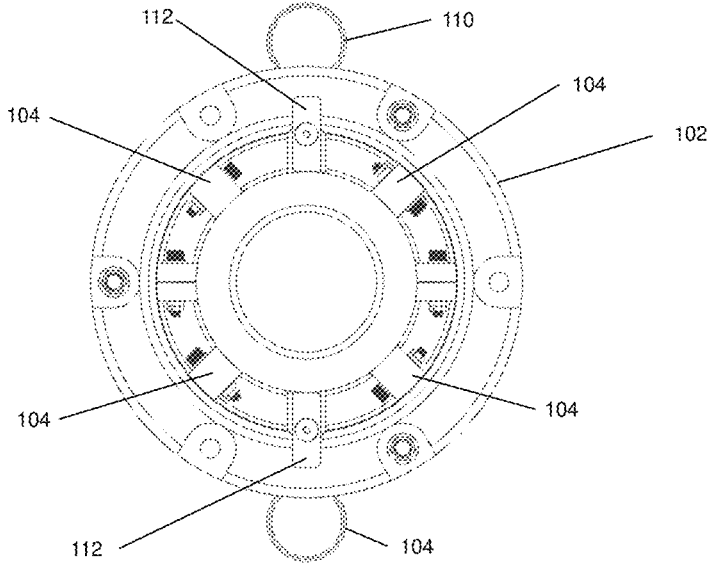
FIG. 5 is an view of the exemplary apparatus shown in FIG. 1.
Figure 6:
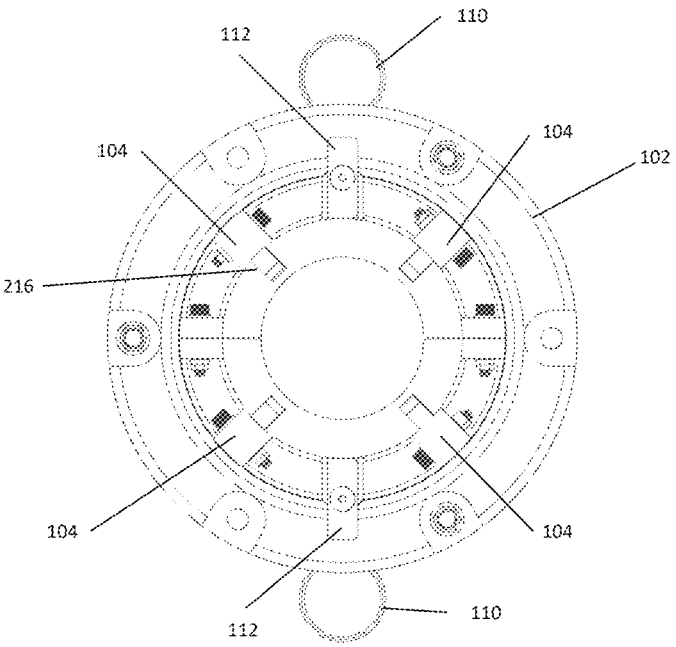
FIG. 6 is an end view of the exemplary apparatus shown in FIG. 1 with the fingers in the engaged, or closed position of the apparatus.
Figure 7:
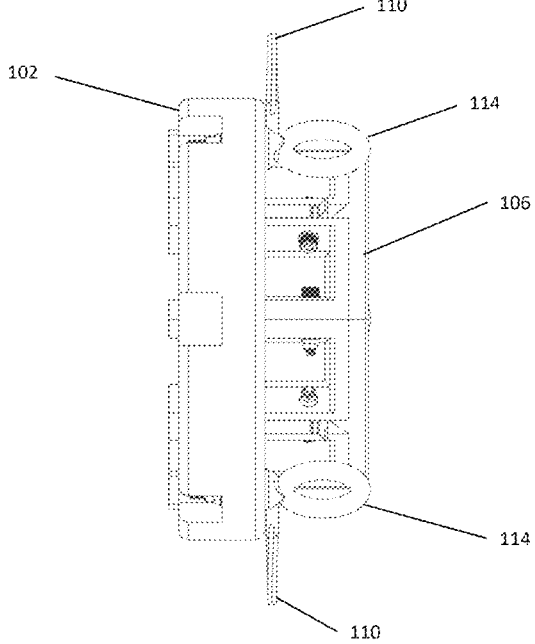
FIG. 7 is a side view of the exemplary apparatus shown in FIG. 1.

FIG. 4 illustrates an exemplary assembly diagram for the rook member 106. In one embodiment, the rook assembly 116 can comprise a two-piece assembly. As shown in FIG. 4, in this example, a first member 402 is configured to be connected to a second member 404. The first member 402 and the second member 404 are configured to be disposed around the tube 12 of a flange 10, such as a NW/KF50 flange.

In the example of FIG. 4, the first member 402 and the second member 404 are configured to be bolted together. In alternate embodiments, the first member 402 and the second member 404 can be connected together in any suitable manner other than including bolt or screw fasteners. For example, the first member 402 and the second member 404 can be formed and secured in a manner that allows the first member 402 and the second member 404 to be disposed around the tube portion 12, as shown in FIG. 8, for example In the example, a screw fastener 410 is used to secure the plate member 112 to the post member 108. In alternate embodiments, any suitable fastener or fastening mechanism can be used to secure the plate member 112 to the post member 108, other than including a screw fastener. For example, the plate member 112 could be welded or formed as an integrated portion of the post member 108. Generally, the plate members 112 are configured to provide a stop for the slip collar 102 and prevent the slip collar 102 from moving when engaged with the flange(s) 10 in order to ensure a reliable connection during vacuum operations.

Once the rook assembly 106 is disposed around the tube portion 12 of a vacuum tube, the slip collar 102 is configured to be moved forward over the rook assembly 106 toward the plate members 112. Referring to FIG. 8, in this example, the slip collar 102 has been moved in the direction X1 until the surface or side 902 of the slip collar 102 contacted the plate member(s) 112. The plate member(s) act as a stop and prevent the slip collar 102 from moving further over the rook assembly 106

To ensure full engagement of the two flanges 10, the slip collar 102 is configured to push the finger members 202 of respective spring finger assemblies 104 over the coupling of the two flanges 10. The end(s) 216 of respective finger member (202) engage with a surface of the flange member and the two flange members are secured together in a suitable manner. This forms a secure connection or coupling of the two flange members. An example is illustrated in FIG. 10.

Figure 10:
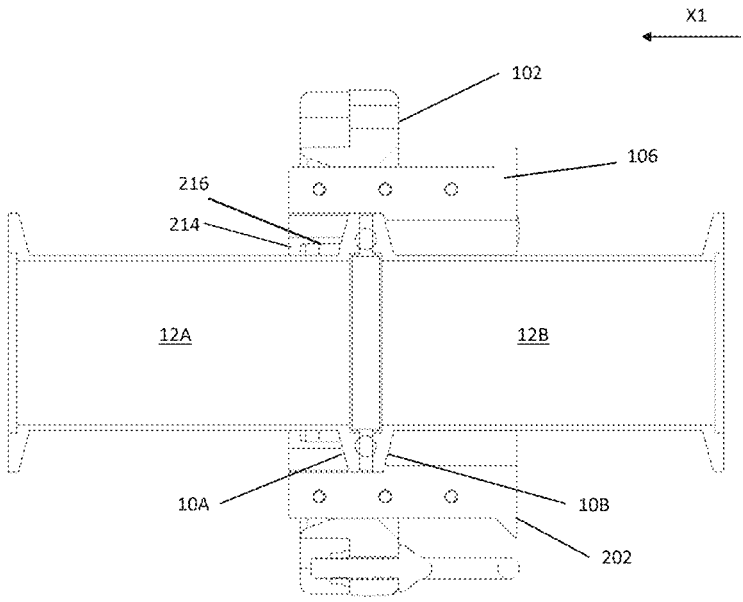
FIG. 10 illustrates a side cross-sectional view of the example of FIG. 9 along the line Z1-Z1.
Figure 11:
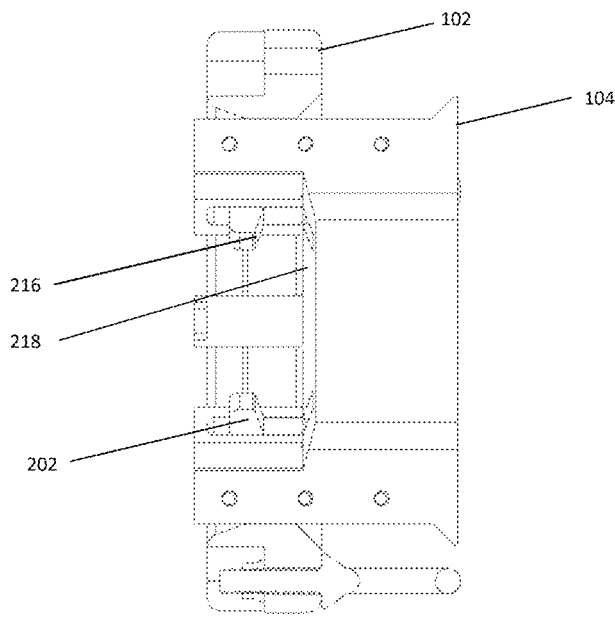
FIG. 11 illustrates a view of FIG. 9 without the pipe member.

In the example of FIGS. 10 and 11, pipe 12A includes flange member 10A and pipe member 12B includes flange member 10B. The slip collar 102 in this example has been moved in the direction X1 over finger members 202 of the rook assembly 106. The end 216 of the finger member 202 has engaged a surface of the flange member 10A. An end 218 of the finger housing member 214, also referred to as a tab or plate member, engages with a surface of the flange member 10B. FIG. 11 shows a view without the pipes 12A, 12B. As shown in this example, the end 216 and the end 218 are suitably shaped to engage with a surface shape of the two flange members 10A and 10B. In this manner, the flange members 10A and 10B are securely coupled together, such as for vacuum operations.

Referring again to FIG. 8, in one embodiment, once the slip collar assembly 102 is pushed forward and the spring-loaded finger assemblies 104 engaged with the flange(s) 10, a pin 110 is configured to be inserted into the clamping device 100 in order to prevent accidental disconnection of the spring-loaded finger assemblies 104 during vacuum operation. As shown in FIG. 3, pins 110 are configured to be inserted into respective openings 116 of the rook assembly 106. The pins 110, once inserted, are configured to prevent the slip collar 102 from moving away from the plate members 112.

The slip collar 102 in this example, is disposed between the plate members 112 and the pin members 110. When the pin 110 is inserted, the slip collar 102 is trapped between the tab or plate member 112 and the end of the finger housing member 218, and cannot physically move.

Although only two pin members 110 are illustrated in the example of FIG. 3, the aspects of the disclosed embodiments are not so limited. In alternate embodiments, any suitable number of pin members 110 can be utilized in order to prevent the slip collar 102 from moving resulting in accidental disconnection of the spring-loaded finger assemblies 104.

In one embodiment, the tab member 216 shown in FIG. 2, also referred to as a safety tab, is configured to enable forceful release in case of stuck springs, adding redundancy. According to an embodiment, when the slip collar 102 moves in the direction X2, shown in FIG. 8, the slip collar 102 contacts the safety tab 216 and causes the finger assembly 102 to pivot, releasing the clamping assembly 100 from the flanges 10.

The clamping device 100 of the disclosed embodiments is configured to be disengaged remotely. Referring to FIG. 8, in one embodiment, a linear actuator or winch can be used to disengage the clamping device 100. As shown in FIG. 10, a line or cable 120 is configured to be connected to the eye ring 114. The eye ring 114 is secured to the slip collar assembly 102. As shown in the example of FIG. 8, the eye ring 114 is secured to the slip collar 102 using a bolt. In alternate embodiments, the eye ring 114 can be secured to the slip collar 102 in any suitable manner that allows a force to be applied in order to slide or move the slip collar over the flanges 10. The pin 110 is removed prior to remote disengagement.

The example of FIG. 3 shows three eye rings 114. In alternate embodiments, any suitable number of eye rings 114 can be used, other than including three. Also, while any eye ring 114 is generally described herein, any suitable mechanism or device can be used in place of an eye ring that allows a line or cable mechanism to be attached or connected to the slip collar 102 in order to remotely disconnect the slip collar 102 and release the clamping assembly 100 from the flanges 10.

Figures 12, 13, 14:
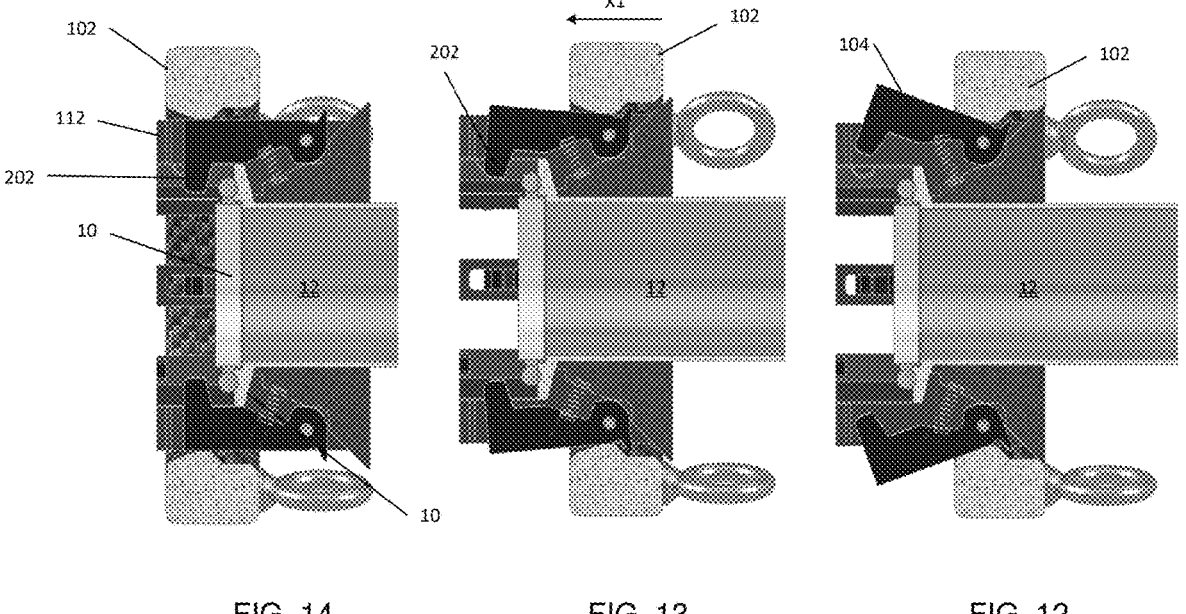
FIG. 12 illustrates an example of an exemplary apparatus of the disclosed embodiments in an open or disengaged state about a flange.
FIG. 13 illustrates an example of an exemplary apparatus of the disclosed embodiments in a half-open or half-engaged state about a flange.
FIG. 14 illustrates an example of an exemplary apparatus of the disclosed embodiments in a closed or engaged state about a flange.

FIG. 12 illustrates the apparatus 100 in an open or disengaged state. As shown in FIG. 12, the slip collar assembly 102 has not engaged the finger assembly 102.

In FIG. 13, the slip collar assembly 102 has been moved partially over the finger assembly 104, referred to herein as a half-open or engaged state. The finger member 202 is pushed in an inwards direction, toward the midline of the pipe member 12A. Only one half of pipe and flange members are shown in this example.

As is illustrated in FIG. 14, once the slip collar assembly 102 is moved against the plate member 112, the finger member 202 is in the closed or engaged state.

In one embodiment, the slip collar 102 and rook assembly 106 can be 3-D printed from a suitable material. In one embodiment, the 3D printing process includes 3D printing a component using a resin-based process. Any suitable stereolithography (SLA) resin-based printer can be used to fabricate the parts.

In one embodiment, the 3D-printed structure guides the safe removal of the clamping device 100 from the flange 10. The clamping device 100 of the disclosed embodiments offers a practical and cost effective solution for reliable vacuum flange connections and remote disconnection in a high vacuum environment.

Modifications to embodiments of the aspects of the disclosed embodiments described in the foregoing are possible without departing from the scope of the aspects of the disclosed embodiments as defined by the accompanying claims. Expressions such as "including", "comprising", "incorporating", "have", "is" used to describe and claim the aspects of the disclosed embodiments are intended to be construed in a non-exclusive manner, namely allowing for items, components or elements not explicitly described also to be present. Reference to the singular is also to be construed to relate to the plural.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vacuum finger clamping device, comprising:
a slip collar assembly;
a rook assembly, the rook assembly comprising one or more spring-loaded finger assemblies; and
one or more eye rings secured to the slip collar assembly, wherein the slip collar assembly is configured to be disposed over the rook assembly to cause the finger member to engage with a surface of a first flange member of a vacuum tube connection in an engaged state of the clamping device, and
wherein the one or more eye rings is configured to engage with one or more of a linear actuator or winch that is configured to exert a force on the slip collar assembly to disengage the slip collar assembly from the one or more spring-loaded finger assemblies.

2. The vacuum finger clamping device according to claim 1, wherein a finger member of the one or more spring-loaded finger assemblies includes a pivot end and a hook end, the hook end configured to engage with the surface of the first flange member as the slip collar assembly slides over the finger member.

3. The vacuum finger clamping device according to claim 2, further comprising a spring member disposed between the pivot end of the finger member and a housing for the finger member, the spring member configured to be in a compressed state when the slip collar assembly is disposed over the finger member in the engaged state.

4. The vacuum finger clamping device according to claim 1, further comprising a plate member disposed on an end of a housing member for the finger assembly, the plate member configured to engage with a surface of a second flange member of the vacuum tube connection in the engaged state of the device.

5. The vacuum finger clamping device according to claim 1, wherein the rook assembly further comprises a post member, a plate member disposed at one end of the post member, the plate member configured to engage a surface of the slip collar when the slip collar is disposed over the rook assembly in the engaged state of the device.

6. The vacuum finger clamping device according to claim 1, wherein the clamping device is configured to be decoupled from the vacuum tube connection from a remote location.

7. The vacuum finger clamping device according to claim 1, wherein the rook assembly further comprises a base member, the base member including an opening configured to accommodate a tube portion of a vacuum tube, and wherein one end of the one or more spring-loaded finger assemblies and one end of a post member are disposed on the base member.

8. The vacuum finger clamping device according to claim 7, wherein the rook assembly further comprises a first member and a second member, the first member and the second member being configured to be disposed around the tube portion of the vacuum tube and connected together.

9. The vacuum finger clamping device according to claim 1, wherein the clamping device is configured for a nominal width vacuum flange.

10. The vacuum finger clamping device according to claim 1, further comprising a pin member, the pin member configured to be inserted into an opening on the rook assembly and prevent movement of the slip collar assembly.

11. The vacuum finger clamping device according to claim 10, wherein the slip collar assembly is configured to be secured between a plate member disposed on the rook assembly and the pin member.

* * * * *